US011035023B2

(12) United States Patent
Lister et al.

(10) Patent No.: US 11,035,023 B2
(45) Date of Patent: *Jun. 15, 2021

(54) REACTOR SYSTEMS FOR RECOVERING METALS, AND RELATED METHODS

(71) Applicant: Battelle Energy Alliance, LLC, Idaho Falls, ID (US)

(72) Inventors: Tedd E. Lister, Lewisville, ID (US); Jacob A. Parkman, Fuquay-Varina, NC (US); Luis A. Diaz Aldana, Idaho Falls, ID (US); Gemma Clark, Idaho Falls, ID (US); Eric J. Dufek, Ammon, ID (US); Philip Keller, Knoxville, TN (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,429

(22) Filed: Jul. 29, 2019

(65) Prior Publication Data

US 2019/0352742 A1 Nov. 21, 2019

Related U.S. Application Data

(63) Continuation of application No. 15/690,717, filed on Aug. 30, 2017, now Pat. No. 10,378,081, which is a
(Continued)

(51) Int. Cl.
*C22B 3/00* (2006.01)
*C22B 3/08* (2006.01)
(Continued)

(52) U.S. Cl.
CPC .............. *C22B 11/046* (2013.01); *C22B 3/08* (2013.01); *C22B 3/10* (2013.01); *C22B 3/44* (2013.01);
(Continued)

(58) Field of Classification Search
None
See application file for complete search history.

(56) References Cited

U.S. PATENT DOCUMENTS 3,729,397 A    4/1973   Goldsmith et al.
3,772,003 A    11/1973  Gordy
(Continued)

FOREIGN PATENT DOCUMENTS

CA    2294373 A1    12/1998
GB    2368349 A     5/2002
(Continued)

OTHER PUBLICATIONS

Lyman et al, Recycling of Rare Earths and Iron from NdFeB Magnet Scrap, High Termperature Materials and Processes, vol. 11, Issue 1-4, Jan. 1984, pp. 175-187 (Year: 1984).*
(Continued)

Primary Examiner — Harry D Wilkins, III
(74) Attorney, Agent, or Firm — TraskBritt

(57) ABSTRACT

A method of recovering metals from electronic waste comprises providing a powder comprising electronic waste in at least a first reactor and a second reactor and providing an electrolyte comprising at least ferric ions in an electrochemical cell in fluid communication with the first reactor and the second reactor. The method further includes contacting the powders within the first reactor and the second reactor with the electrolyte to dissolve at least one base metal from each reactor into the electrolyte and reduce at least some of the ferric ions to ferrous ions. The ferrous ions are oxidized at an anode of the electrochemical cell to regenerate the ferric ions. The powder within the second reactor comprises a higher weight percent of the at least one base metal than the powder in the first reactor. Additional methods of recovering
(Continued)

metals from electronic waste are also described, as well as an apparatus of recovering metals from electronic waste.

24 Claims, 4 Drawing Sheets

Related U.S. Application Data continuation of application No. 14/845,101, filed on Sep. 3, 2015, now Pat. No. 9,777,346.

(51) Int. Cl.

| | |
|---|---|
| C22B 3/10 | (2006.01) |
| C22B 3/44 | (2006.01) |
| C25C 1/06 | (2006.01) |
| C25C 1/08 | (2006.01) |
| C25C 1/12 | (2006.01) |
| C25C 1/14 | (2006.01) |
| C25C 1/16 | (2006.01) |
| C25C 1/18 | (2006.01) |
| C25C 1/20 | (2006.01) |
| C25C 1/22 | (2006.01) |
| C25C 7/02 | (2006.01) |
| C25C 7/06 | (2006.01) |
| C22B 11/00 | (2006.01) |

(52) U.S. Cl.
CPC .................. *C25C 1/06* (2013.01); *C25C 1/08* (2013.01); *C25C 1/12* (2013.01); *C25C 1/14* (2013.01); *C25C 1/16* (2013.01); *C25C 1/18* (2013.01); *C25C 1/20* (2013.01); *C25C 1/22* (2013.01); *C25C 7/02* (2013.01); *C25C 7/06* (2013.01); *Y02P 10/20* (2015.11)

(56) References Cited

U.S. PATENT DOCUMENTS

| | | | |
|---|---|---|---|
| 3,798,026 | A | 3/1974 | Milner et al. |
| 4,070,182 | A | 1/1978 | Genik-Sas-Berezowsky et al. |
| 4,557,759 | A | 12/1985 | McGrew et al. |
| 4,637,865 | A | 1/1987 | Sergent et al. |
| 4,654,078 | A | 3/1987 | Perez et al. |
| 5,005,806 | A | 4/1991 | Krauth |
| 5,045,160 | A | 9/1991 | Hanulik |
| 5,051,128 | A | 9/1991 | Kubo |
| 5,487,819 | A | 1/1996 | Everett |
| 5,569,370 | A | 10/1996 | Gomez |
| 5,622,615 | A * | 4/1997 | Young .................. C22B 15/0071 205/582 |
| 6,641,712 | B1 | 11/2003 | Gibson et al. |
| 6,660,059 | B2 | 12/2003 | Ji et al. |
| 7,166,145 | B1 | 1/2007 | Han |
| 8,551,212 | B1 | 10/2013 | Kawarizadeh |
| 9,777,346 | B2 | 10/2017 | Lister et al. |
| 10,378,081 | B2 * | 8/2019 | Lister ........................ C22B 3/44 |
| 2005/0255017 | A1 | 11/2005 | Okada et al. |
| 2006/0219571 | A1 | 10/2006 | Kim et al. |
| 2011/0017644 | A1 | 1/2011 | Valerio |
| 2012/0148461 | A1 | 6/2012 | Rosenberg et al. |
| 2013/0001093 | A1 | 1/2013 | Marsden et al. |
| 2013/0030450 | A1 | 1/2013 | Dreyfuss et al. |
| 2013/0091989 | A1 * | 4/2013 | Sun ........................ C22B 34/225 75/739 |
| 2013/0336857 | A1 | 12/2013 | Korzenski et al. |
| 2014/0311896 | A1 | 10/2014 | Lapidus et al. |
| 2014/0322107 | A1 * | 10/2014 | Maeba ................... C22B 59/00 423/21.1 |
| 2015/0114182 | A1 | 4/2015 | Parkes et al. |

FOREIGN PATENT DOCUMENTS

| | | | |
|---|---|---|---|
| JP | 62-083433 | A | 4/1987 |
| WO | 20061013568 | A2 | 2/2006 |
| WO | 20111130622 | A1 | 10/2011 |
| WO | 20131030450 | A1 | 3/2013 |
| WO | 20131104895 | A1 | 7/2013 |
| WO | 20151036801 | A1 | 3/2015 |

OTHER PUBLICATIONS

Barhgusen et al., "Processing of monazite sands", Ames Laboratory ISC Technical Reports, Paper 178, (Dec. 1957), 25 pages.
Behera et al, Leaching Kinetics Study of Neodymium from the Scrap Magnet Using Acetic Acid, Separation and Purification Technology, Feb. 2016, vol. 160, pp. 59-66 (Year 2016).
Behnamfard et al, Process devlopment for recovery of copper and precious metals from waste printed circuit boards with emphasize on palladium and gold leaching and precipitation, Waste Management, vol. 33, No. 11, Aug. 2013 (first available online), pp. 2354-2363.
Binnemans et al., "Recycling of rare earths: a critical review," Journal of Cleaner Production, 51, 2013, pp. 1-22.
Brandon et al., "Metal Recovery from Electronic Scrap by Leaching and Electrowinning," available at http://www.electrochem.org/dl/ma/200/pdfs/0822.pdf, last accessed Jul. 20, 2015, one (1) page.
Cheng et al., "Electrochemical Recovery of Metals from End-of-Life Electrical & Electronic Systems," Research conducted at Imperial College London, one (1) page.
Chieng, MPhil Thesis entitled "Recovery of silver from lead/zinc flotation tailings by thiosulfate leaching," School of Engineering, The University of Queensland, 2006, available at http://espace.library.uq.edu.au/view/UQ:241964, last accessed Jul. 26, 2015, four (4) page.
Cui et al, Metallurgical recovery of metals from electronic waste: A review, Jounral of Hazardous Materials, vol. 158, No. 2-3, Oct. 2008, pp. 228-256.
Duan et al., "Liberation of valuable materials in waste printed circuit boards by high-voltage electrical pulses," Minerals Engineering, 70, 2015, pp. 170-177.
Ficeriova et al., "Leaching of gold, silver and accompanying metals from circuit boards (PCBs) waste," Acta Montanistica Slovaca, 16, 2, 2011, pp. 128-131.
Ficeriova et al., "Thiosulfate leaching of silver, gold and bismuth from a complex sulfide concentrates," Hydrometallurgy, 77, 2005, pp. 35-39.
Figueroa et al., "Kinetic Aspects of Gold and Silver Recovery in Cementation with Zinc Power and Electrocoagulation Iron Process," Advances in Chemical Engineering and Science, 2, 2012, pp. 342-349.
Fogarasi et al., "Copper recovery and gold enrichment from waste printed circuit boards by mediated electrochemical oxidation," Journal of Hazardous Materials, 273, 2014, pp. 215-221.
International Search Report from International Application No. PCT/US2016/047190, dated Oct. 26, 2016, 2 pages.
International Written Opinion from International Application No. PCT/US2016/047190, dated Oct. 26, 2016, 7 pages.
Jiricny et al., "Copper Electrowinning using Spouted-Bed Electrodes: Part I. Experiments with Oxygen Evolution or Matte Oxidation at the Anode," Metallurgical and Materials Transactions B, vol. 33B, Oct. 2002, pp. 669-676.
Jiricny et al., "Copper Electrowinning using Spouted-Bed Electrodes: Part II. Copper Electrowinning with Ferrous Ion Oxidation as the Anodic Reaction," Metallurgical and Materials Transactions B, vol. 33B, Oct. 2002, pp. 577-683.
Kim et al., "Selective recovery of gold from waste mobile phone PCBs by hydrometallurgical process," Journal of Hazardous Materials, 198, 2011, pp. 206-215.
Lee et al, Selective Leaching Process for Neodymium Recovery from Scrap Nd-Fe-B Manget, Metallurgical and Materials Transactions A, Sep. 2013, vol. 44, No. 13, pp. 5825-5833 (Year 2013).
Lister et al., "Electrorecycling of Critical and Value Metals from Mobile Electronics," Conference of Metallurgists Proceedings, 2014,

(56) References Cited

OTHER PUBLICATIONS

Published by the Canadian Institute of Mining, Metallurgy and Petroleum, 11 pages.
Lister et al., "Recovery of critical and value metals from mobile electronics enabled by electrochemical processing," Hydrometallurgy, 149, 2014, pp. 228-237.
Lyman et al, Report of Investigations RI-9481 Recycling of Neodymium Iron Boron Magnet Scrap, US Department of the Interior Bureau of Mines, Nov. 1993 (Year 1993).
Lyman etal, Neodymium and Iron Recovery from NdFeB Permanent Magnet Scrap, excerpt from Residues and Effluents: Processing and Environmental Considerations, Edited by Reddy et al, 1991 (no month available), pp. 717-731 (Year: 1991).
Maat et al, An Innovative Process Using Only Water and Sodium Chloride for Recovering Rare Earth Elements from Nd—Fe—B Permanent Magnets Found in the Waste and Electronic Equipment, ACS Sustainable Chemistry & Engineering, Sep. 2016, vol. 4, No. 12, pp. 6455-6462 (Year: 2016).
Navarro et al., "On the use of zinc for gold cementation from ammoniacal-thiosulphate solutions," Minerals Engineering, 17, 2004, pp. 825-831.
Peelman et al., "Leaching of Rare Earth Elements: Past and Present," 1st European Rare Earth Resources Conference, Sep. 2014, pp. 446-456.
Petrova et al., "Silver Recovery from Spent Photographic Solutions by Natural Magnetite: Attempts to Estimate the Process Mechanism and Optimal Process Conditions," International Review of Chemical Engineering, vol. 4, N. 3, May 2012, pp. 373-378.
Quinet et al., "Recovery of precious metals from electronic scrap by hydrometallurgical processing routes," Minerals & Metallurgical Processing, vol. 22, No. 1, Feb. 2005, pp. 17-22.

\* cited by examiner

REACTOR SYSTEMS FOR RECOVERING METALS, AND RELATED METHODS

CROSS-REFERENCE TO RELATED APPLICATION

This application is a continuation of U.S. patent application Ser. No. 15/690,717, filed Aug. 30, 2017, now U.S. Pat. No. 10,378,081, issued Aug. 13, 2019 which is a continuation of U.S. patent application Ser. No. 14/845,101, filed Sep. 3, 2015, now U.S. Pat. No. 9,777,346, issued Oct. 3, 2017, the disclosure of each of which is hereby incorporated herein in its entirety by this reference.

STATEMENT REGARDING FEDERALLY SPONSORED RESEARCH OR DEVELOPMENT

This invention was made with government support under Contract Number DE-AC07-05-1D14517 awarded by the United States Department of Energy. The government has certain rights in the invention.

FIELD

Embodiments of the disclosure relate generally to methods of recovering metals from electronic waste, and to related systems for recovering such metals. More particularly, embodiments of the disclosure relate to sequentially recovering base metals from electronic waste, followed by recovering precious metals, such as silver, gold, and palladium therefrom.

BACKGROUND

Electronic devices such as smart phones, tablets, desktop computers, laptop computers, televisions, and other electronics contain a significant amount of valuable metals. End-of-life electronic devices (also referred to as electronic waste, or so-called "e-waste") contain metals including base metals (e.g., zinc, tin, lead, nickel, and copper) and precious metals (e.g., silver, gold, palladium) in electronic circuity of such devices. For example, electronic devices may include circuitry connected by copper traces, nickel leads and terminals, nickel plating on conductive traces, solder (which may include tin, silver, copper, and combinations thereof) used to form electrical connections between conductive components, surface contacts coated with gold, and capacitors including silver and palladium. The electronic devices also include rare earth magnets formed from rare earth elements (e.g., neodymium, yttrium, samarium, etc.) within circuity, speakers, displays, storage devices (e.g., hard disk drives), vibrating components of telephones, and other electronic components of the device.

Currently, the metals contained in electronic waste are not sufficiently recovered prior to disposing the electronic waste. In some instances, the electronic waste is landfilled or combusted (e.g., incinerated) without recovering a significant portion of the metals therein. Landfilling the electronic waste has the potential to contaminate soil and underground water. The combustion process may release toxic compounds (e.g., lead) into the atmosphere.

Methods of recycling the metals in the electronic waste have been proposed. Such methods include leaching the electronic waste with a strong acid which includes dissolving a majority, if not all, of the metals in the electronic waste in a single leaching solution (leachate). However, it is difficult to recover substantially pure metals of each of the metals dissolved in the leachate. In addition, the leaching process produces hydroxide ions that increase a pH of the leachate and consume a significant amount of the acid therein. To compensate for the increase in pH, additional fresh acid is added to the leachate, undesirably consuming a significant amount of the acid.

Accordingly, there is a continuing need for methods of recovering substantially pure metals from electronic waste without consuming large amounts of acid while recovering substantially pure elemental metals.

BRIEF SUMMARY

In accordance with one embodiment described herein, a method of recovering metals from electronic waste comprises providing a powder comprising electronic waste in at least a first reactor and a second reactor, providing an electrolyte comprising at least ferric ions in an electrochemical cell in fluid communication with the first reactor and the second reactor, contacting the powder within the first reactor with the electrolyte to dissolve at least one base metal from the powder into the electrolyte and reduce at least some of the ferric ions to ferrous ions, contacting the powder within the second reactor with the electrolyte to dissolve at least one base metal from the powder into the electrolyte, the powder in the second reactor comprising a higher weight percent of the at least one base metal than the powder in the first reactor, and oxidizing the ferrous ions at an anode of the electrochemical cell to regenerate the ferric ions.

In additional embodiments, a reactor system for recovering metals from electronic waste comprises a plurality of reactors substantially filled with a powder comprising electronic waste, a first electrochemical cell comprising a first electrolyte including ferrous ions, ferric ions, and at least one of hydrochloric acid and sulfuric acid in fluid communication with at least some of the plurality of reactors, and a vessel including a leachate, the vessel configured to be in fluid communication with each of the plurality of reactors.

In further embodiments, another method of recovering metals from electronic waste comprises providing a first reactor including powderized electronic waste, a second reactor including powderized electronic waste, and a third reactor including powderized electronic waste, providing a first electrolyte comprising iron ions in a first electrochemical cell, passing the first electrolyte from the first electrochemical cell to the first reactor, from the first reactor to the second reactor, and from the second reactor to the first electrochemical cell, reducing at least one of dissolved silver, dissolved copper, dissolved nickel, dissolved lead, dissolved tin, and dissolved zinc from within the first electrolyte at a cathode of the first electrochemical cell, providing a vessel including a leachate, placing the first reactor in fluid communication with the vessel, placing the third reactor in fluid communication with the first electrochemical cell, contacting the powder in the first reactor with the leachate to dissolve at least one of silver and palladium within the powder in the leachate, and passing the first electrolyte from the first electrochemical cell to the second reactor, from the second reactor to the third reactor, and from the third reactor to the first electrochemical cell.

DETAILED DESCRIPTION

Methods of recovering rare earth elements, base metals, and precious metals from electronic waste (e.g., cell phones, printed circuit boards (PCBs), laptop computers, desktop computers, televisions, etc.) are described, as are reactor systems for recovering such materials from electronic waste. After initial shredding of the electronic waste, the magnetic portions may be separated from the non-magnetic portions thereof. The magnetic portions include rare earth-based magnets and ferrous components (e.g., steel) while the non-magnetic portions include base metals and precious metals. The non-magnetic portions are reduced to a powder and the base and precious metals are recovered by sequential electrochemical and leaching processes. The base metals and precious metals are recovered in elemental form without consuming large amounts of chemicals, such as leachates or oxidants. The reactor system is configured to selectively place one or more reactors of a plurality of reactors in fluid communication with one or more chemistries formulated for recovering a particular metal found in the electronic waste. Accordingly, the methods and systems of the disclosure may increase the recovery efficiency of metals from electronic waste, increase purity of the recovered metals, and consume fewer chemicals than other methods of recovering metals from electronic waste.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or reaction system for recovering metals from electronic waste. The structures described below do not form a complete apparatus or a complete reaction system. Only those process acts and structures necessary to understand the embodiments of the disclosure are described in detail below. Additional acts to recover metals from electronic waste may be performed by conventional recovery techniques. Also note, any drawings accompanying the present application are for illustrative purposes only, and are thus not drawn to scale. Additionally, elements common between figures may retain the same numerical designation.

Figure 1:
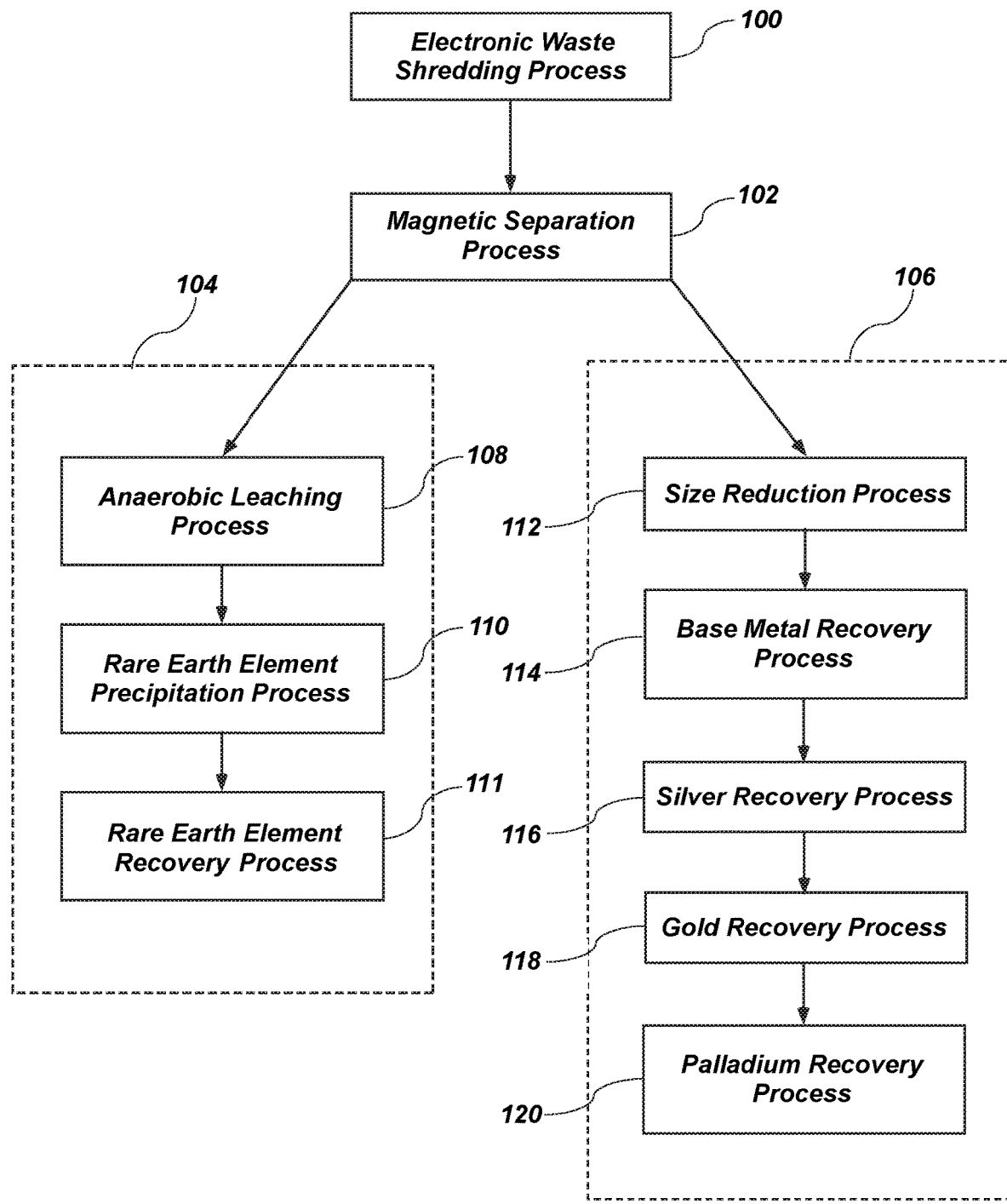
FIG. 1 is a simplified flow diagram of a method of recovering metals from electronic waste, in accordance with embodiments of the disclosure.

FIG. 1 is a simplified flow diagram illustrating a method of recovering metals from electronic waste, in accordance with embodiments of the disclosure. The method may include an electronic waste shredding process 100 that includes shredding the electronic waste into smaller portions; a magnetic separation process 102 that includes separating magnetic portions of the shredded electronic waste from non-magnetic portions thereof; a magnetic component recovery process 104 (shown in broken lines); and a non-magnetic component recovery process 106 (shown in broken lines). The magnetic component recovery process 104 may include an anaerobic leaching process 108 including exposing the magnetic components to a sulfuric acid leachate in a leaching vessel while purging oxygen from the leaching vessel; a rare earth element precipitation process 110 including precipitating dissolved rare earth elements as double salts from the leachate; and a rare earth element recovery process 111 including recovering precipitated double salts of the rare earth elements and converting the double salts to hydroxides of the rare earth elements. The non-magnetic component recovery process 106 may include a size reduction process 112 (e.g., a milling process) including reducing a size of the non-magnetic components to a powder; a base metal recovery process 114 including recovering at least one of zinc, tin, lead, nickel, copper, and, optionally, silver from the powder and depositing the at least one of zinc, tin, lead, nickel, copper, and, optionally, silver on a cathode of an electrochemical cell; an optional silver recovery process 116 including leaching silver from the powder and recovering the silver from the leachate; a gold recovery process 118 including leaching gold from the powder and depositing the gold on a cathode of an electrochemical cell; and a palladium recovery process 120 including leaching palladium from the powder and recovering the palladium from the leachate.

The electronic waste shredding process 100 includes mechanically shredding or otherwise cutting electronic waste (e.g., cell phones, printed circuit boards (PCBs), laptop computers, desktop computers, televisions, etc.) into smaller pieces. The electronic waste shredding process 100 may include substantially detaching magnetic materials of the electronic waste from the non-magnetic materials thereof. During the electronic waste shredding process 100, the magnetic materials may attach to steel or other ferrous materials of the electronic waste. In some embodiments, the electronic waste is shredded in an e-waste shredder or an e-scrap shredder.

Magnetic components in the electronic waste may include rare earth-based magnets and magnetic materials located in hard disk drives (HDDs), loudspeakers, displays, batteries, and in vibrating assemblies of the electronic devices. The magnetic separation process 102 includes separating the magnetic materials from the non-magnetic materials of the shredded electronic waste. Methods of separating magnetic materials from non-magnetic materials are known in the art and therefore, are not described in detail herein. By way of non-limiting example, the shredded electronic waste may be placed onto a lower conveyor belt configured to pass under an upper conveyor belt disposed around a stationary magnetic assembly. The magnetic materials may attach to the upper conveyor belt as the lower conveyor belt passes under the magnetic assembly. As the upper conveyor belt rotates, the magnetic materials may fall outside of the magnetic field of the magnetic assembly and may fall from the upper conveyor belt. Accordingly, the magnetic material may be separated from the non-magnetic material.

The magnetic component recovery process 104 includes dissolving the rare earth elements located in the magnetic materials of the electronic waste in the anaerobic leaching process 108, precipitating the dissolved rare earth elements in the rare earth element precipitation process 110, and recovering the rare earth elements in the rare earth element recovery process 111. The anaerobic leaching process 108 includes exposing the rare earth elements to a leachate and dissolving the rare earth elements in the leachate. The leachate may include sulfuric acid, nitric acid, hydrochloric acid, or perchloric acid. In some embodiments, the leachate includes sulfuric acid at about 1 molar (1 M). In some embodiments, a pH of the leachate may be maintained at about 0.5 or lower, such as by adding additional acid to the leachate.

During the leaching process, the rare earth elements may react with water and protons from the leachate to dissolve the rare earth elements, while steel in the magnetic materials may undesirably react with oxygen, as shown in the following reactions for a rare earth magnet alloy of neodymium (e.g., $Nd_2Fe_{14}B$):

$$Nd_2Fe_{14}B(s) + 3H_2O(aq) + 34H^+ \rightarrow 2Nd^{+3}(aq) + 14Fe^{+2}(aq) + H_3BO_3(aq) + 18.5H_2(g) \quad (1)$$

$$2Fe + O_2 + 4H^+ 4H^+ \rightarrow 2H_2O \quad (2)$$

As indicated in reaction 2 above, oxygen may react with the steel present in the magnetic material. In some embodiments, the anaerobic leaching process 108 includes purging oxygen from the vessel in which the magnetic components are leached to facilitate leaching of the rare earth elements (e.g., reaction 1) and reduce leaching of the steel (e.g., reaction 2). By way of non-limiting example, a reaction vessel in which the anaerobic leaching process 108 takes place may be purged of oxygen to reduce the amount of steel leaching.

The rare earth element precipitation process 110 may include increasing the pH of the leachate to precipitate the rare earth elements dissolved therein. In some embodiments, the rare earth elements precipitate as double salts. The pH of the leachate may be increased by, for example, adding one or more of sodium hydroxide (NaOH), potassium hydroxide (KOH), or ammonium hydroxide ($NH_4OH$) to the leachate. In some embodiments, the pH of the leachate may be increased to a pH of between about 2.0 and about 2.5. In some embodiments, the pH of the leachate is increased by adding, for example, 5 M NaOH to the leachate. In other embodiments, double salts of the rare earth elements may be precipitated by adding potassium sulfate, sodium sulfate, or a combination thereof to the leachate. In yet other embodiments, the rare earth elements may be precipitated as an oxalate or a fluoride. Methods of precipitating rare earth elements are known in the art and, therefore, are not described in detail herein.

The rare earth element recovery process 111 may include recovering the precipitated double salts of the rare earth elements formed during the rare earth element precipitation process 110 and exposing the rare earth element double salts to a hydroxide (e.g., NaOH) to form a rare earth element hydroxide (e.g., $Nd(OH)_3$).

The non-magnetic component recovery process 106 includes reducing a size of the non-magnetic components into a powder in the size reduction process 112. The size reduction process 112 may include milling (e.g., ball milling) the non-magnetic materials to a powder having a particle size below about 1 mm. In some embodiments, the electronic waste is milled to a powder having a size between about 0.1 mm and about 1.0 mm, such as between about 0.1 mm and about 0.5 mm or between about 0.5 mm and about 1.0 mm, although the size of the powder is not so limited. The powder may include base metals and precious metals from the electronic waste as well as glass and other non-magnetic materials.

Figure 2:
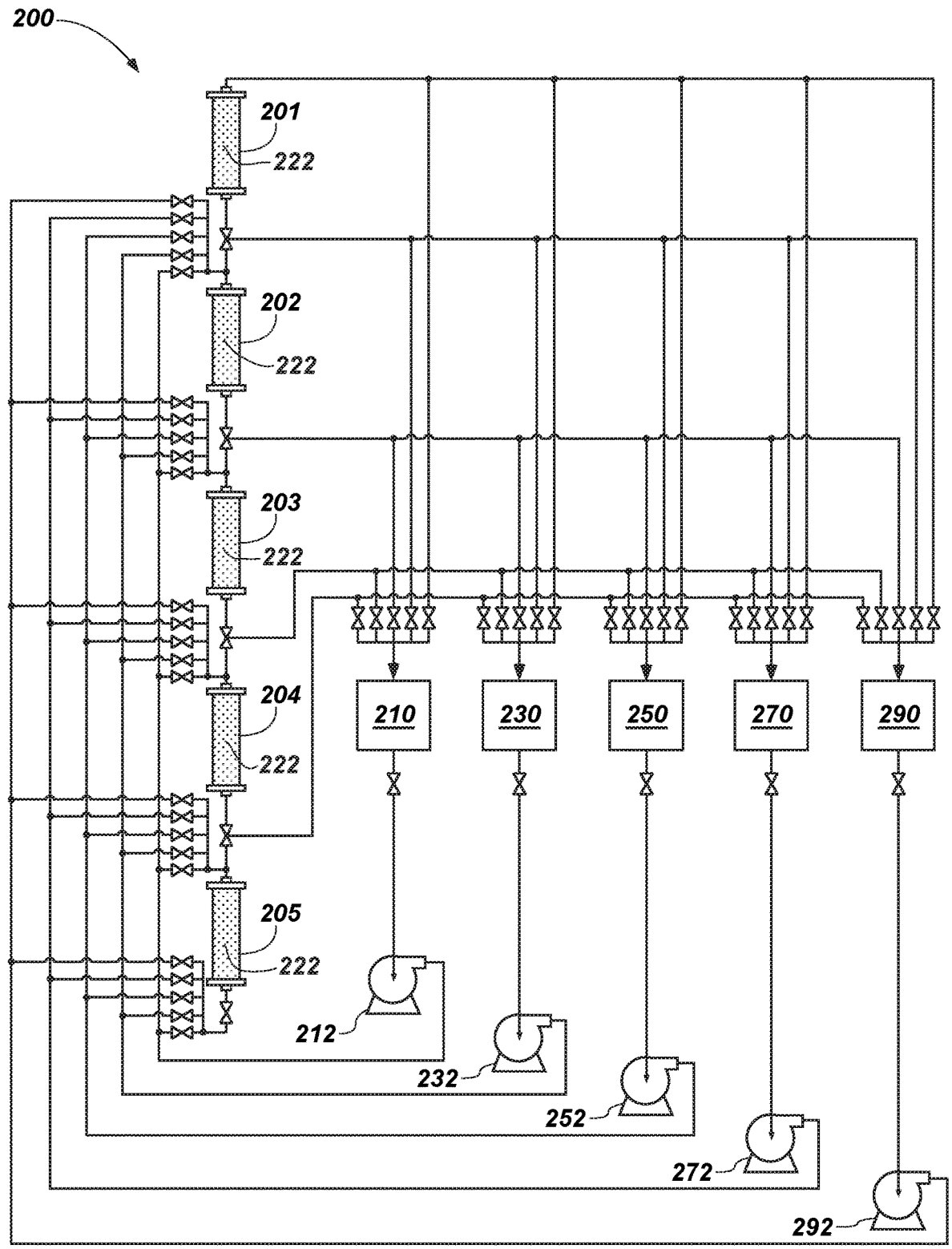
FIG. 2 is simplified schematic illustrating a reaction system, in accordance with embodiments of the disclosure.

Referring to FIG. 2, a reactor system 200 for the base metal recovery process 114, the silver recovery process 116, the gold recovery process 118, and the palladium recovery process 120 is illustrated. The reactor system 200 includes a plurality of reactors (e.g., a first reactor 201, a second reactor 202, a third reactor 203, a fourth reactor 204, and a fifth reactor 205, etc.) that are configured to be in fluid communication with one or more of a first electrochemical cell 210 for the base metal recovery process 114, a first leaching vessel 230 for the silver recovery process 116, a second electrochemical cell 250 for the gold recovery process 118, a second leaching vessel 270 for the palladium recovery process 120, and a rinse solution tank 290 for rinsing any of the reactors of the plurality of reactors. Pumps 212, 232, 252, 272, 292 may be connected to the first electrochemical cell 210, the first leaching vessel 230, the second electrochemical cell 250, the second leaching vessel 270, and the rinse solution tank 290, respectively, to pump solutions therefrom to each of the plurality of reactors, depending on the configuration of the reactor system 200.

Although five reactors are illustrated in FIG. 2, in some embodiments, the plurality of reactors may include more or less reactors (e.g., three, four, six, seven, etc.) than the number illustrated. Each of the first reactor 201, the second reactor 202, the third reactor 203, the fourth reactor 204, and the fifth reactor 205 may be loaded with powder 222 formed during the size reduction process 112, as described above. Each of the plurality of reactors may be of substantially the same design, construction, and materials.

The reactor system 200 may be configured such that each of the plurality of reactors is configured to be exposed to different chemistries formulated to recover the metals from the powders 222 disposed within the reactors. The reactor system 200 may be configured such that each of the plurality of reactors may be selectively placed in fluid communication with each of the first electrochemical cell 210, the first leaching vessel 230, the second electrochemical cell 250, the second leaching vessel 270, and the rinse solution tank 290. For example, as illustrated in FIG. 2, the reactor system 200 may include one or more valves configured to selectively place each of the plurality of reactors in fluid communication with one or more of the first electrochemical cell 210, the first leaching vessel 230, the second electrochemical cell 250, the second leaching vessel 270, and the rinse solution tank 290. The reactor system 200 may further be configured to selectively place one or more reactors in series behind one or more other reactors. For example, as will be described herein, the reactor system 200 may be configured to selectively place at least a first reactor in fluid communication with, for example, at least a second reactor and the first electrochemical cell 210.

The reactor system 200 may also be configured to selectively isolate each of the plurality of reactors from each other and from one or more of the first electrochemical cell 210, the first leaching vessel 230, the second electrochemical cell 250, the second leaching vessel 270, and the rinse solution tank 290. For example, each reactor may be configured to be isolated from the reactor system 200 for loading and unloading the powder 222 therefrom while the other reactors of the plurality of reactors remain in fluid communication with other portions of the reactor system 200. Accordingly, at any one time, one or more of the reactors of the plurality of reactors may be in fluid communication with the first electrochemical cell 210, while one or more other reactors of the plurality of reactors is in fluid communication with the first leaching vessel 230, one or more reactors is in fluid communication with the second electrochemical cell 250, and one or more other reactors is in fluid communication with the second leaching vessel 270. Yet another reactor may be offline (e.g., isolated from fluid communication from other portions of the reactor system 200), so that powders 222 disposed therein may be removed and replaced with fresh powder 222 including base metals and precious metals to be recovered therefrom.

With reference again to FIG. 1, the base metal recovery process 114 includes exposing the powder 222 (FIG. 2) in at least one of the reactors of the plurality of reactors to an electrolyte comprising an oxidizer, dissolving at least one base metal within the powder 222 with the electrolyte, and recovering the at least one base metal at a cathode of the first electrochemical cell 210 (FIG. 2).

Figure 3:
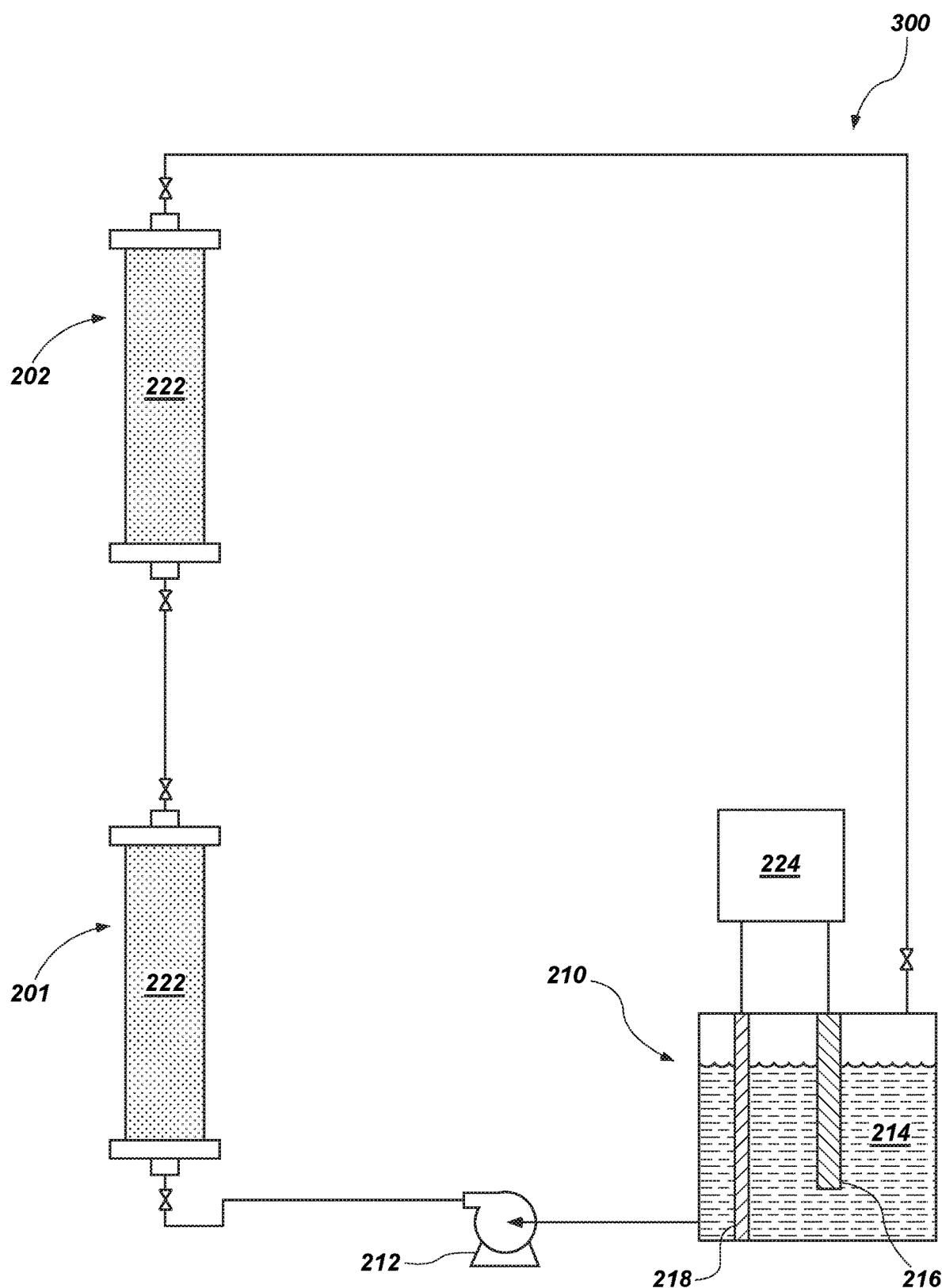
FIG. 3 is a simplified schematic illustrating an electrochemical cell in fluid communication with a plurality of reactors configured in series, in accordance with embodiments of the disclosure.

Referring to FIG. 3, a first electrochemical reaction system 300 is illustrated. The first electrochemical reaction system 300 includes the first electrochemical cell 210 in fluid communication with at least the first reactor 201 and at least the second reactor 202. The first electrochemical cell 210 may include an electrolyte 214, a cathode 216, and an anode 218. The anode 218 may comprise a carbon material, such as a carbon felt. The cathode 216 may comprise stainless steel (e.g., 304 stainless steel), nickel, or other suitable materials that are not substantially corroded by the chemistry of the electrolyte 214. The anode 218 and the cathode 216 may be connected to a power supply 224 configured for applying a current between the anode 218 and the cathode 216. Although the anode 218 and the cathode 216 are illustrated as being in communication with the electrolyte 214 in the same chamber, in some embodiments, the anode 218 and the cathode 216 may be isolated from each other. For example, in some embodiments, an ionic membrane may isolate the anode 218 and the cathode 216 from each other.

The electrolyte 214 may include ferrous ions ($Fe^{2+}$) and ferric ions ($Fe^{2+}$) dissolved in one of hydrochloric acid or sulfuric acid. The electrolyte 214 may be formed by dissolving ferric chloride ($FeCl_3$), ferrous chloride ($FeCl_2$), or a combination thereof in one of hydrochloric acid or sulfuric acid. Where the electrolyte 214 comprises hydrochloric acid, a concentration of the hydrochloric acid may be between about 0.1 M and about 1.0 M hydrochloric acid, such as between about 0.1 M and about 0.5 M, or between about 0.5 M and about 1.0 M hydrochloric acid. In embodiments where the electrolyte 214 comprises sulfuric acid, a concentration of the sulfuric acid may be between about 0.05 M and about 2.0 M sulfuric acid, such as between about 0.05 M and about 1.0 M, or between about 1.0 M and about 2.0 M sulfuric acid.

The pump 212 may be in fluid communication with the first electrochemical cell 210 and may be configured to pump the electrolyte 214 from the first electrochemical cell 210 to the first reactor 201. With continued reference to FIG. 3, the first reactor 201 and the second reactor 202 may be connected in series and, therefore, the electrolyte 214 may pass from the first reactor 201 to the second reactor 202, and from the second reactor 202 to the first electrochemical cell 210.

In the first reactor 201, ferric ions in the electrolyte 214 may oxidize and dissolve the base metals located in the powder 222. Oxidation of the base metals may reduce the ferric ions to ferrous ions. For example, zinc, tin, lead (if present in the electronic waste), nickel, copper, and optionally, silver may be dissolved, according to the following reactions, respectively:

$$2Fe^{3+}(aq)+Zn(s) \rightarrow Fe^{2+}(aq)+Zn^{2+}(aq) \quad (3),$$

$$2Fe^{3+}(aq)+Sn(s) \rightarrow Fe^{2+}(aq)+Sn^{2+}(aq) \quad (4),$$

$$2Fe^{3+}(aq)+Pb(s) \rightarrow Fe^{2+}(aq)+Pb^{2+}(aq) \quad (5),$$

$$2Fe^{3+}(aq)+Ni(s) \rightarrow Fe^{2+}(aq)+Ni^{2+}(aq) \quad (6),$$

$$2Fe^{3+}(aq)+Cu(s) \rightarrow Fe^{2+}(aq)+Cu^{2+}(aq) \quad (7),$$

$$Fe^{3+}(aq)+Ag(s) \rightarrow Fe^{2+}(aq)+Ag^{+}(aq) \quad (8)$$

The silver may be dissolved when the electrolyte 214 includes sulfuric acid and may not be dissolved when the electrolyte 214 includes hydrochloric acid. In some embodiments, the electrolyte 214 is formulated such that precious metals in the powder 222 (e.g., silver, gold, and palladium) do not dissolve therein, but rather, remain as solids in the powder 222. Thus, in some embodiments, the electrolyte 214 may be formulated to dissolve base metals without substantially dissolving the precious metals.

In some embodiments, the base metals dissolve in order of lowest reduction potential to highest reduction potential (i.e., less noble metals (e.g., zinc, tin, and lead) dissolve prior to more noble metals (e.g., nickel, copper, and silver)), according to the galvanic series (also referred to in the art as the "electropotential series"). By way of non-limiting example, if copper in the powder 222 is contacted by the electrolyte 214 and dissolves, the dissolved copper may be reduced into elemental form upon contacting an undissolved metal having a lower reduction potential (e.g., zinc, tin, or lead) while the metal with a lower reduction potential is dissolved in the electrolyte 214. For example, dissolved copper may react with undissolved tin, such as in the following galvanic reaction:

$$Cu^{2+}(aq)+Sn(s) \rightarrow Cu(s)+Sn^{+2}(aq) \quad (9).$$

Accordingly, the metals in the powder 222 may be dissolved in the electrolyte 214 according to their relative reduction potentials.

As described above, the first electrochemical reaction system 300 may be configured such that the electrolyte 214 passes from the first reactor 201 to the second reactor 202. Zinc, tin, lead, nickel, copper, and optionally, silver within the powder 222 of the second reactor 202 may dissolve in the electrolyte 214 as described above with reference to the first reactor 201.

After contacting the powder 222 in the second reactor 202, the electrolyte 214 may flow to the first electrochemical cell 210 where it is brought into contact with the cathode 216. The dissolved metals (e.g., $Zn^{2+}$, $Sn^{2+}$, $Pb^{2+}$, $Ni^{2+}$, $Ag^{+}$) may be reduced (e.g., electrowon) at the cathode 216 and deposited in elemental form thereon, according to the following reactions:

$$Zn^{2+}(aq)+2e^{-} \rightarrow Zn(s) \quad (10),$$

$$Sn^{2+}(aq)+2e^{-} \rightarrow Sn(s) \quad (11),$$

$$Pb^{2+}(aq)+2e^{-} \rightarrow Pb(s) \quad (12),$$

$$Ni^{2+}(aq)+2e^{-} \rightarrow Ni(s) \quad (13),$$

$$Cu^{2+}(aq)+2e^{-} \rightarrow Cu(s) \quad (14),$$

$$Ag^{+}(aq)+e^{-} \rightarrow Ag(s) \quad (15).$$

In some embodiments, zinc, tin, lead, and nickel may deposit on the cathode 216 prior to copper (or silver) being deposited on the cathode 216. For example, as described above, the base metals may dissolve into the electrolyte 214 based on their respective reduction potentials. Thus, if zinc, tin, lead, and nickel dissolve from the powders 222 prior to dissolution of copper, the zinc, tin, lead, and nickel may be deposited at the cathode 216 prior to deposition of copper at the cathode 216. In some embodiments, zinc, tin, lead, and nickel are dissolved together and deposit on the cathode 216 together, while copper is deposited in substantially pure elemental form, without a substantial amount of zinc, tin, lead, or nickel. Accordingly, the base metals may be recovered sequentially at the cathode 216 based on the order in which they were dissolved.

The ferrous ions may be oxidized to ferric ions at the anode 218 where the ferric ions are regenerated, as shown in the reaction below:

$$Fe^{2+}(aq) \rightarrow Fe^{3+}(aq) + e^- \qquad (16).$$

The first electrochemical cell 210 may be operated at a current density of between about 5 mA/cm² and about 200 A/cm², such as between about 5 mA/cm² and about 50 mA/cm², between about 50 mA/cm² and about 100 mA/cm², or between about 100 mA/cm² and about 200 mA/cm². In some embodiments, the current density is between about 100 mA/cm² and about 200 mA/cm².

The first electrochemical reaction system 300 may be operated at a wide range of temperatures and pressures. The first electrochemical reaction system 300 may be operated at, for example, between about a freezing point of the electrolyte 214 and about a boiling point of the electrolyte 214 (each of which may depend on, for example, the molarity of the hydrochloric acid or sulfuric acid in the electrolyte 214). In some embodiments, the first electrochemical reaction system 300 is operated at ambient temperature (e.g., between about 20° C. and about 25° C., such as about 22° C.). The pressure of the first electrochemical reaction system 300 may be sufficient for the electrolyte 214 to flow from the first electrochemical cell 210, through each of the first reactor 201 and the second reactor 202 and back to the first electrochemical cell 210. Accordingly, the pressure of the first electrochemical cell 210 may depend on pressure losses through the powder 222 in the first reactor 201 and the second reactor 202.

As described above, the pump 212 may be in fluid communication with the first electrochemical cell 210 and may be configured to pump the electrolyte 214, including the regenerated oxidizer (e.g., ferric ions), to the first reactor 201. Thus, the first electrochemical reaction system 300 may be configured such that the electrolyte 214 passes from the first electrochemical cell 210 to the first reactor 201, from the first reactor 201 to the second reactor 202, and from the second reactor 202 to the first electrochemical cell 210.

Accordingly, base metals from electronic waste may be deposited on the cathode 216 of the first electrochemical cell 210 in an electrowinning process. In some embodiments, the base metals may be deposited as a group (e.g., one or more of zinc, tin, lead, nickel, and copper) and may be collected at the cathode 216 as an alloy. The alloy may include bronze (which may include tin and copper and trace amounts of silver), an alloy of copper and nickel (e.g., constantan or cupronickel), or other alloys including two or more of zinc, tin, lead, nickel, copper, and silver. In other embodiments, the base metals may be deposited on the cathode 216 in sequential order (e.g., from less noble to more noble) based on the order in which the base metals are dissolved in the reactors. By way of example, tin, copper, and silver may be recovered in substantially pure form. The metals recovered at the cathode 216 may be substantially pure. In some embodiments, each of the metals recovered at the cathode 216 may have a purity between about 80 percent and about 100 percent, such as between about 80 percent and about 85 percent, between about 85 percent and about 90 percent, between about 90 percent and about 95 percent, or between about 95 percent and about 100 percent.

Although FIG. 3 illustrates the first reactor 201 and the second reactor 202, the first electrochemical reaction system 300 may include any of the plurality of reactors, depending on the particular configuration of the reactor system 200 (FIG. 2).

Advantageously, the first electrochemical reaction system 300 does not consume the oxidizer of the electrolyte 214 (e.g., the ferric or ferrous ions) or the acid of the electrolyte 214. Rather, as described above, the oxidizer in the electrolyte 214 is regenerated in the electrochemical cell 210. Thus, the first electrochemical reaction system 300 is configured to recover base metals without consuming large amounts of oxidizer or acid, as in some conventional recycling or electrochemical recycling operations.

In some embodiments, configuring the first electrochemical reaction system 300 with the second reactor 202 in series behind the first reactor 201 may improve the efficiency of the electrorecycling process compared to an electrorecycling process including only one reactor. As the electrolyte 214 cycles through the first reactor 201, the rate of dissolution (and hence, the rate of recovery) of the base metals decreases over time. For example, not all of the ferric ions are reduced in the first reactor 201, resulting in less dissolved metals in the electrolyte 214. The ferric ions that do not oxidize the metals in the powder 222 return to the cathode 216 and are reduced to ferrous ions at the cathode 216, which are regenerated to ferric ions at the anode 218, reducing the efficiency of the first electrochemical cell 210. Accordingly, as described above, the first reactor 201 and the second reactor 202 may be placed in series. In some embodiments, the powder 222 in the first reactor 201 may have previously been exposed to the electrolyte 214 and may, therefore, include a lower weight percent of the base metals than the powder 222 in the second reactor 202. The powder 222 in the second reactor 202 may include a higher amount (e.g., a higher concentration) of base metals. In some embodiments, the powder 222 in the second reactor 202 may be fresh powder (e.g., may not have previously been exposed to the electrolyte 214).

Accordingly, the electrolyte 214 from the first electrochemical cell 210 may pass through the first reactor 201 having a lower weight percent of the base metals than the powder 222 in the second reactor 202. Therefore, the freshly regenerated electrolyte 214 from the first electrochemical cell 210 comprising a higher concentration of oxidant (e.g., $Fe^{3+}$) may contact powders 222 having a lower weight percent of base metals in the first reactor 201 prior to contacting powders 222 having a higher weight percent of base metals in the second reactor 202. The higher weight percent of base metals in the powder 222 in the second reactor 202 may substantially completely reduce the ferric oxidizer to ferrous ions. Accordingly, the efficiency of the first electrochemical reaction system 300 may be improved by contacting a powder 222 including a lower weight percent of base metals in the first reactor 201 prior to contacting a powder 222 including a higher weight percent of base metals in the second reactor 202, which may be accomplished by passing the electrolyte 214 through the first reactor 201 and second reactor 202 in series.

After a predetermined period of time, substantially all of the base metals in the first reactor 201 may have been recovered at the cathode 216 of the first electrochemical cell 210. In some embodiments, the first reactor 201 may be taken out of fluid communication with the first electrochemical cell 210, such as by opening and closing one or more valves of the reactor system 200 (FIG. 2) and, as discussed below, precious metals may be recovered therefrom, such as in the silver recovery process 116, the gold recovery process 118, and the palladium recovery process 120. The reactor system 200 may be configured to place, for example, the third reactor 203 in fluid communication with the first electrochemical cell 210, such as by opening and closing one or more valves of the reactor system 200. In some embodiments, the reactor system 200 is configured such that the third reactor 203 is placed in fluid communication with the first electrochemical cell 210 in series behind the second reactor 202. Accordingly, the reactor system 200 may be configured such that the electrolyte 214 flows from the first electrochemical cell 210 to the second reactor 202, from the second reactor 202 to the third reactor 203, and from the third reactor 203 to the first electrochemical cell 210. Since the second reactor 202 has previously been contacted with the electrolyte 214, the third reactor 203 may include a higher weight percent of base metals (e.g., such as in freshly loaded powder 222) than the second reactor 202. The process of recovering the base metals from the second reactor 202 and the third reactor 203 may continue until the base metals are substantially completely recovered from the second reactor 202, at which point, the second reactor 202 is taken out of fluid communication with the first electrochemical cell 210 and another new reactor (e.g., the fourth reactor 204) may be placed in series behind the third reactor 203 as the cycle continues. Thus, a reactor having a higher weight percent of base metals may be located in series behind a reactor including a powder having at least some of the base metals removed therefrom.

With reference again to FIG. 1, after recovering the base metals in the base metal recovery process 114, silver may be recovered from the powder 222 (FIG. 2) in the silver recovery process 116 (e.g., such as in embodiments where the electrolyte 214 includes hydrochloric acid). The silver recovery process 116 may include recovering silver from the powder 222 from which substantially all of the base metals have been recovered. For example, silver may be recovered from the powder 222 in the first reactor 201 after the base metals have been recovered during the base metal recovery process 114. In some embodiments, the powder 222 in the first reactor 201 may be rinsed by flowing, for example, water from the rinse solution tank 290 (FIG. 2) through the first reactor 201. The water used to rinse the electrolyte 214 from the first reactor 201 may flow back to the first electrochemical cell 210.

In embodiments in which the electrolyte 214 (FIG. 3) includes hydrochloric acid, the silver in the powder 222 may be oxidized by the ferric ions and the oxidized silver ions (e.g., $Ag^+$) may react with the chloride ions from the hydrochloric acid to form insoluble silver chloride (AgCl). During the silver recovery process 116, the silver chloride in the first reactor 201 may be exposed to a leachate formulated to dissolve the silver from the silver chloride. The leachate may include a thiosulfate (e.g., $S_2O_3^{2-}$), such as ammonium thiosulfate (($NH_4$)$_2S_2O_3$), calcium thiosulfate ($CaS_2O_3$), potassium thiosulfate ($K_2S_2O_3$), sodium thiosulfate ($Na_2S_2O_3$), or combinations thereof. In some embodiments, the leachate includes sodium thiosulfate at a concentration of between about 0.1 M and about 2.0 M, such as between about 0.1 M and about 0.5 M, between about 0.5 M and about 1.0 M, or between about 1.0 M and about 2.0 M.

The leachate may be contained in the first leaching vessel 230. The reactor system 200 may be configured to place the first reactor 201 in fluid communication with the first leaching vessel 230, such as by opening and closing one or more valves. The pump 232 may be configured to pump the leachate from the first leaching vessel 230 to the first reactor 201. After passing through the first reactor 201, the leachate may be directed back to the first leaching vessel 230.

The thiosulfate in the leachate may react with the silver chloride to form silver thiosulfate ($[Ag(S_2O_3)_2]^{3-}$), according to the following reaction.

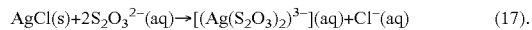

$$AgCl(s)+2S_2O_3^{2-}(aq) \rightarrow [(Ag(S_2O_3)_2)^{3-}](aq)+Cl^-(aq) \qquad (17).$$

The leachate may be cycled through the first reactor 201 until the leachate is saturated with silver thiosulfate. In some embodiments, the first leaching vessel 230 may include enough leachate to leach silver from a plurality of reactors.

After the leachate in the first leaching vessel 230 is saturated with silver thiosulfate, the silver from the silver thiosulfate may be recovered. In some embodiments, the silver is reduced by cementation wherein a metal that is more electropositive than silver is added to the solution to precipitate the silver. By way of non-limiting example, the silver thiosulfate may be exposed to one or more of zinc, aluminum, and iron to form pure silver by reduction. In some embodiments, zinc powder is added to first leaching vessel 230 to reduce the silver according to the following reaction:

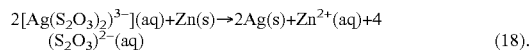

$$2[Ag(S_2O_3)_2)^{3-}](aq)+Zn(s) \rightarrow 2Ag(s)+Zn^{2+}(aq)+4(S_2O_3)^{2-}(aq) \qquad (18).$$

Where the precipitating agent is aluminum or iron, the reduction of silver is substantially the same.

The pure silver may be recovered by passing the solution including the silver through a filter and recovering the solids that do not pass through the filter, by settling, or by other methods of solid-liquid separation, as known in the art. In some embodiments, the recovered silver has a purity greater than 95 percent, such as between about 95 percent and about 97 percent, between about 97 percent and about 99 percent, or greater than 99 percent.

In some embodiments, additional leachate may be added to the first leaching vessel 230 after the precipitated silver is recovered.

In other embodiments, where the electrolyte 214 of the base metal recovery process 114 includes sulfuric acid, the silver may dissolve in the electrolyte 214. In some such embodiments, the silver may be recovered at the cathode 216 of the first electrochemical cell 210 in substantially pure form after recovering zinc, tin, lead, nickel, and copper, or as an alloy with one or more of zinc, tin, lead, nickel, and copper.

The first reactor 201 may be rinsed after the silver is recovered from the powder 222 therein. The first reactor 201 may be rinsed by flowing, for example, water from the rinse solution tank 290 through the first reactor 201. The water used to rinse the first reactor 201 may be returned to the first leaching vessel 230.

Figure 4:
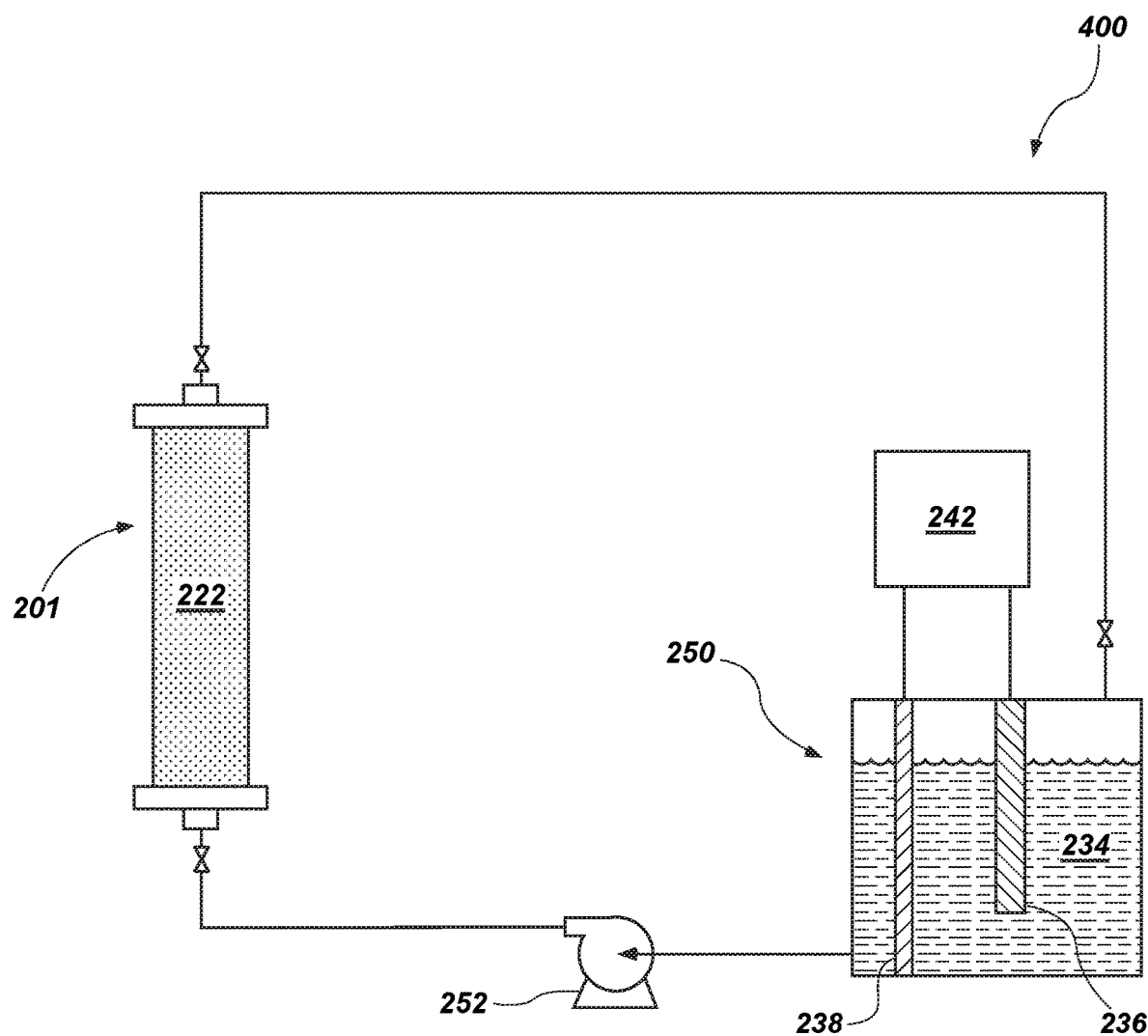
FIG. 4 is a simplified schematic illustrating another electrochemical cell in fluid communication with a reactor, in accordance with embodiments of the disclosure.

After recovering the base metals in the base metal recovery process 114 and silver during the silver recovery process 116, gold may be recovered from the powder 222. The reactor system 200 (FIG. 2) may be configured to place the first reactor 201 in fluid communication with the second electrochemical cell 250. Referring to FIG. 4, a second electrochemical reaction system 400 for recovering gold is illustrated. The second electrochemical reaction system 400 includes the second electrochemical cell 250, which may comprise an electrolyte 234 including iodide, a cathode 236 and an anode 238. The anode 238 and the cathode 236 may be connected to a power supply 242 configured for applying a current between the anode 238 and the cathode 236.

In some embodiments, the electrolyte 234 may include iodide ions ($I^-$) and triiodide ions ($I_3^-$). The iodide ions may be formed by dissolving potassium iodide (KI), sodium iodide (NaI), another iodide salt, or combinations thereof in water or another solvent. The pH of the electrolyte 234 may be maintained at approximately 7.0. The electrolyte 234 may include between about 0.05 M and about 1.0 M potassium iodide, such as between about 0.05 M and about 0.2 M, between about 0.2 M and about 0.5 M, or between about 0.5 M and about 1.0 M.

The pump 252 may be configured to pump the electrolyte 234 from the second electrochemical cell 250 to the first reactor 201. The powder 222 in the first reactor 201 may be contacted with the electrolyte 234. The electrolyte 234 may be formulated to dissolve the gold in the powder 222, forming gold complexes, according to the following reactions:

$$Au(s)+2I^-(aq) \rightarrow AuI_2^-(aq)+e^- \qquad (19),$$

$$Au(s)+4I^-(aq) \rightarrow AuI_4^-(aq)+3e^- \qquad (20),$$

$$2Au(s)+I_3^-(aq)+I^-(aq) \rightarrow AuI_2^-(aq) \qquad (21).$$

The dissolved gold complexes may pass from the first reactor 201 to the second electrochemical cell 250, where the gold complexes come into contact with the cathode 236. At the cathode 236, the gold complexes may be reduced (e.g., electrowon) and deposited as gold on the cathode 236, according to the following reactions:

$$AuI_2^-(aq)+e^- \rightarrow Au(s)+2I^-(aq) \qquad (22),$$

$$AuI_4^-(aq)+2e^- \rightarrow AuI_2^-(aq)+2I^-(aq) \qquad (23),$$

$$AuI_4^-(aq)+3e^- \rightarrow Au(s)+4I^-(aq) \qquad (24).$$

In some embodiments, the recovered gold has a purity greater than 95 percent, such as between about 95 percent and about 97 percent, between about 97 percent and about 99 percent, or greater than 99 percent.

At the anode 238, the iodide ions in the electrolyte 234 may be oxidized to regenerate the triiodide ions, according to the following reaction:

$$3I^-(aq) \rightarrow I_3^-(aq)+2e^- \qquad (25).$$

The iodide ions may pass from the second electrochemical cell 250 to the first reactor 201 where the iodide ions contact the gold in the powder 222 and form gold complexes, as the cycle repeats. Accordingly, the iodide may dissolve the gold in the powder 222, the dissolved gold may be recovered at the cathode 236, and the iodide may be regenerated at the anode 238.

In other embodiments, the gold recovery process 118 may include exposing the powder 222 in, for example, the first reactor 201 to a leachate formulated for leaching gold. Leachates for leaching gold may include hypochlorite (e.g., bleach), bromine- or bromide-containing solutions, and cyanide solutions, as known in the art for leaching gold. In some such embodiments, the reactor system 200 may include a leaching vessel including the leachate formulated for leaching gold rather than the second electrochemical cell 250. The gold dissolved in the leachate may be recovered by adding, for example, sodium metabisulphite, zinc metal, oxalic acid, ferrosulfate, or sodium nitrate to the leachate to precipitate the gold, as known in the art for precipitating gold.

In some embodiments, the powder 222 in the first reactor 201 may be rinsed by flowing, for example, water from the rinse solution tank 290 through the first reactor 201. The water used to rinse the first reactor 201 may be flowed back to the second electrochemical cell 250.

Although FIG. 4 illustrates that the reactor of the second electrochemical reaction system 400 includes the first reactor 201, the reactor of the second electrochemical reaction system 400 may include any of the reactors of the reactor system 200 (FIG. 2). For example, the reactor may include any of the reactors from which base metals and silver have been recovered from the powders 222 during the base metal recovery process 114 and the silver recovery process 116, respectively.

Referring to FIG. 1, after the base metals, silver, and gold have been recovered from the powder 222 in the first reactor 201, palladium may be recovered in the palladium recovery process 120. The reactor system 200 (FIG. 2) may be configured to place the first reactor 201 in fluid communication with the second leaching vessel 270.

The palladium may be recovered by contacting the powder 222 with a leachate formulated to leach palladium from the powder 222. The leachate may be contained within the second leaching vessel 270. The leachate may include any chemistry that is known to leach palladium. In some embodiments, the leachate includes hydrogen peroxide and hydrochloric acid, such as about 2 M hydrochloric acid with about 3 volume percent hydrogen peroxide, although other concentrations of hydrochloric acid and hydrogen peroxide may be used.

The pump 272 may be configured to pump the leachate from the second leaching vessel 270 to the first reactor 201. Palladium in the powder 222 is dissolved (e.g., leached) into the leachate according to the following reaction:

$$Pd(s)+4HCl(aq)+H_2O_2(aq) \rightarrow H_2PdCl_4(aq)+2H_2O(aq) \qquad (26).$$

The leachate may flow from the first reactor 201 back to the second leaching vessel 270. The leachate may be cycled through the first reactor 201 until the leachate is saturated with dissolved palladium. In some embodiments, the second leaching vessel 270 includes enough leachate to leach palladium from a plurality of reactors.

After the leachate in the second leaching vessel 270 is saturated with dissolved palladium, the dissolved palladium may be recovered. In some embodiments, the palladium is reduced by cementation wherein a metal that is more electropositive than palladium is added to the solution to reduce the palladium. By way of non-limiting example, the dissolved palladium is exposed to one or more of zinc, aluminum, and tin. In some embodiments, zinc powder may be added to the second leaching vessel 270 to precipitate the palladium (e.g., by reduction), according to the following reaction:

$$PdCl_4^{2-}(aq)+Zn(s) \rightarrow Pd(s)+Zn^{2+}(aq)+4Cl^-(aq) \qquad (27).$$

The precipitated palladium may be recovered by passing the solution including palladium through a filter and recovering solids that do not pass through the filter, by settling, or by other methods of solid-liquid separation, as known in the art. In some embodiments, the recovered palladium has a purity greater than 95 percent, such as between about 95 percent and about 97 percent, between about 97 percent and about 99 percent, or greater than 99 percent.

In some embodiments, additional leachate may be added to the second leaching vessel 270 after the precipitated palladium is recovered.

Although the silver recovery process 116, the gold recovery process 118, and the palladium recovery process 120 have been described with reference to the first reactor 201, it is understood that the silver recovery process 116, the gold recovery process 118, and the palladium recovery process 120 may include any of the plurality of reactors. For example, the reactor system 200 may be configured such that any one reactor or group of reactors of the plurality of reactors may be in fluid communication with one or more of the first electrochemical cell 210, the first leaching vessel 230, the second electrochemical cell 250, the second leaching vessel 270, and the rinse solution tank 290 at any particular time. By way of non-limiting example, in some embodiments, the third reactor 203 and the fourth reactor 204 may be in fluid communication with the first electrochemical cell 210 while the second reactor 202 is in fluid communication with the first leaching vessel 230, and the first reactor 201 is in fluid communication with the second electrochemical cell 250. The fifth reactor 205 may be in fluid communication with the second leaching vessel 270 or may be isolated from the reactor system 200 to be loaded with fresh powder 222. Accordingly, the reactor system 200 may be configured to recover base metals from at least some reactors while simultaneously recovering silver, gold, or palladium from one or more other reactors.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A system for recovering metals from a material, the system comprising:
    a plurality of reactors having a material comprising a plurality of metals;
    a first electrochemical cell comprising a first electrolyte; and
    a first leaching vessel including a first leachate formulated to dissolve at least one metal from the material;
    wherein each reactor of the plurality of reactors is configured to be placed in fluid communication with each of the first electrochemical cell and the first leaching vessel while the material remains within each respective reactor of the plurality of reactors.

2. The system of claim 1, wherein the material comprises a powder.

3. The system of claim 1, wherein the first electrolyte comprises ferric ions and ferrous ions.

4. The system of claim 1, wherein the first leachate comprises a thiosulfate.

5. The system of claim 1, further comprising a second leaching vessel including a second leachate formulated to dissolve, from the material, at least another metal different from the at least one metal.

6. The system of claim 1, further comprising a second electrochemical cell configured to be placed in fluid communication with each reactor of the plurality of reactors, the second electrochemical cell including a second electrolyte formulated to dissolve, from the material, at least another metal different from the at least one metal.

7. The system of claim 1, wherein the material comprises:
    at least one of zinc, tin, lead, nickel, copper, and silver; and
    at least one of gold and palladium.

8. The system of claim 1, further comprising an apparatus for separating magnetic materials from the material comprising a plurality of metals.

9. The system of claim 1, further comprising an apparatus for shredding electronic waste and separating magnetic materials from the material comprising a plurality of metals.

10. A method of recovering metals from a material, the method comprising:
    contacting, with a first electrolyte, a material within a first reactor in fluid communication with a first electrochemical cell to dissolve at least one base metal from the material into the first electrolyte;
    contacting, with the first electrolyte, a material within a second reactor;
    recovering, from the first electrolyte, the at least one base metal in the first electrochemical cell; and
    after contacting the material within the first reactor with the first electrolyte, placing the first reactor in fluid communication with a leaching vessel including a leachate formulated to dissolve at least one precious metal from the material while the material remains in the first reactor.

11. The method of claim 10, wherein placing the first reactor in fluid communication with a leaching vessel including a leachate comprises placing the first reactor in fluid communication with a leaching vessel including a leachate formulated to dissolve gold from the material.

12. The method of claim 10, further comprising placing a third reactor in fluid communication with the first electrochemical cell after placing the first reactor in fluid communication with the leaching vessel.

13. The method of claim 10, further comprising placing the first reactor in fluid communication with a second electrochemical cell comprising a second electrolyte after placing the first reactor in fluid communication with the leaching vessel.

14. The method of claim 10, wherein recovering, from the first electrolyte, the at least one base metal in the first electrochemical cell comprises recovering one or more of zinc, copper, or nickel in the first electrochemical cell.

15. The method of claim 10, further comprising separating magnetic materials from non-magnetic materials of electronic waste, the non-magnetic materials comprising the material.

16. The method of claim 15, further comprising dissolving rare earth elements of the magnetic materials in hydrochloric acid.

17. The method of claim 15, further comprising dissolving rare earth elements of the magnetic materials in an acid.

18. The method of claim 17, further comprising adding a sulfate to the acid including the dissolved rare earth elements to precipitate the rare earth elements and form rare earth element double salts.

19. The method of claim 18, further comprising after forming the rare earth element double salts, exposing the rare earth element double salts to a hydroxide to form a rare earth element hydroxide.

20. A method of recovering metals from a material, the method comprising:
    separating magnetic components from nonmagnetic components of a material;
    exposing the magnetic components to a solution comprising hydrochloric acid to dissolve rare earth elements in the hydrochloric acid;
    adding a sulfate to the solution to precipitate double salts of the dissolved rare earth elements and form rare earth element double salts;
    after forming the rare earth element double salts, exposing the rare earth element double salts to a hydroxide to form a rare earth element hydroxide;

powderizing the nonmagnetic components to form a powder;

passing an electrolyte from an electrochemical cell to a first reactor comprising the powder, from the first reactor to a second reactor comprising the powder, and from the second reactor to the electrochemical cell to dissolve one or more of copper, nickel, lead, tin, or zinc from the powder in each of the first reactor and the second reactor; and placing the first reactor out of fluid communication with the electrochemical cell and in fluid communication with a leaching vessel comprising a leachate comprising hypochlorite, a bromine-containing solution, a bromide-containing solution, or a cyanide solution.

21. The method of claim 20, wherein adding a sulfate to the solution comprises adding potassium sulfate, sodium sulfate, or a combination thereof to the solution.

22. The method of claim 20, wherein exposing the rare earth element double salts to a hydroxide comprises exposing the rare earth element double salts to sodium hydroxide to form the rare earth element hydroxide.

23. The method of claim 20, wherein exposing the magnetic components to a solution comprising hydrochloric acid to dissolve rare earth elements in the hydrochloric acid comprises exposing the magnetic components to the solution in an anaerobic environment.

24. The method of claim 20, further comprising purging oxygen from a vessel including the solution.

* * * * *

UNITED STATES PATENT AND TRADEMARK OFFICE
CERTIFICATE OF CORRECTION

PATENT NO. : 11,035,023 B2  Page 1 of 1
APPLICATION NO. : 16/524429
DATED : June 15, 2021
INVENTOR(S) : Tedd E. Lister et al.

It is certified that error appears in the above-identified patent and that said Letters Patent is hereby corrected as shown below:

In the Specification

Column 1, Line 9, change "2019" to --2019,--
Column 1, Line 19, change "1D14517" to --ID14517--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*